United States Patent [19]
Lakosky

[11] Patent Number: 5,842,763
[45] Date of Patent: Dec. 1, 1998

[54] ILLUMINATED COVER FOR CONTAINERS, TANKS AND THE LIKE

[76] Inventor: Allen J. Lakosky, 804 - 7th Street South, Virginia, Minn. 55792

[21] Appl. No.: 638,858

[22] Filed: Apr. 29, 1996

Related U.S. Application Data

[63] Continuation of Ser. No. 227,268, Apr. 13, 1994, abandoned.
[51] Int. Cl.⁶ .................................................. G01D 11/28
[52] U.S. Cl. .............................. 362/23; 362/28; 362/101; 362/158
[58] Field of Search .................................. 362/23, 28, 96, 362/101, 154, 158, 184, 186, 267, 295, 318; 280/830, 833, 834, 835

[56] References Cited

U.S. PATENT DOCUMENTS

| | | | |
|---|---|---|---|
| 2,753,442 | 7/1956 | Wiswell | 362/186 |
| 3,162,376 | 12/1964 | Furuka | 362/158 |
| 3,426,343 | 2/1969 | Carlson | 362/158 |
| 3,794,825 | 2/1974 | Krupansky | 362/158 |
| 3,857,366 | 12/1974 | Willinger | 362/101 |
| 4,394,716 | 7/1983 | Campagna et al. | 362/158 |
| 4,503,563 | 3/1985 | Johnson | 362/267 |
| 4,734,832 | 3/1988 | Moriano et al. | 362/158 |
| 4,779,174 | 10/1988 | Staten et al. | 362/158 |
| 4,796,167 | 1/1989 | Brown et al. | 362/158 |

*Primary Examiner*—Stephen F. Husar
*Attorney, Agent, or Firm*—Merchant, Gould, Smith, Edell, Welter & Schmidt, P.A.

[57] ABSTRACT

The present invention provides an illuminated cover and gauge assembly including a cover body and a transparent portion connected to the cover body to form a housing resistant to penetration by fluids, particularly volatile fluids such as gasoline. A selectively operable illuminating system, preferably including at least one light emitting diode (LED), a battery electrically connected to the LED and an off/on switch mechanism electrically connected between the battery and the LED is mounted in the housing.

18 Claims, 3 Drawing Sheets

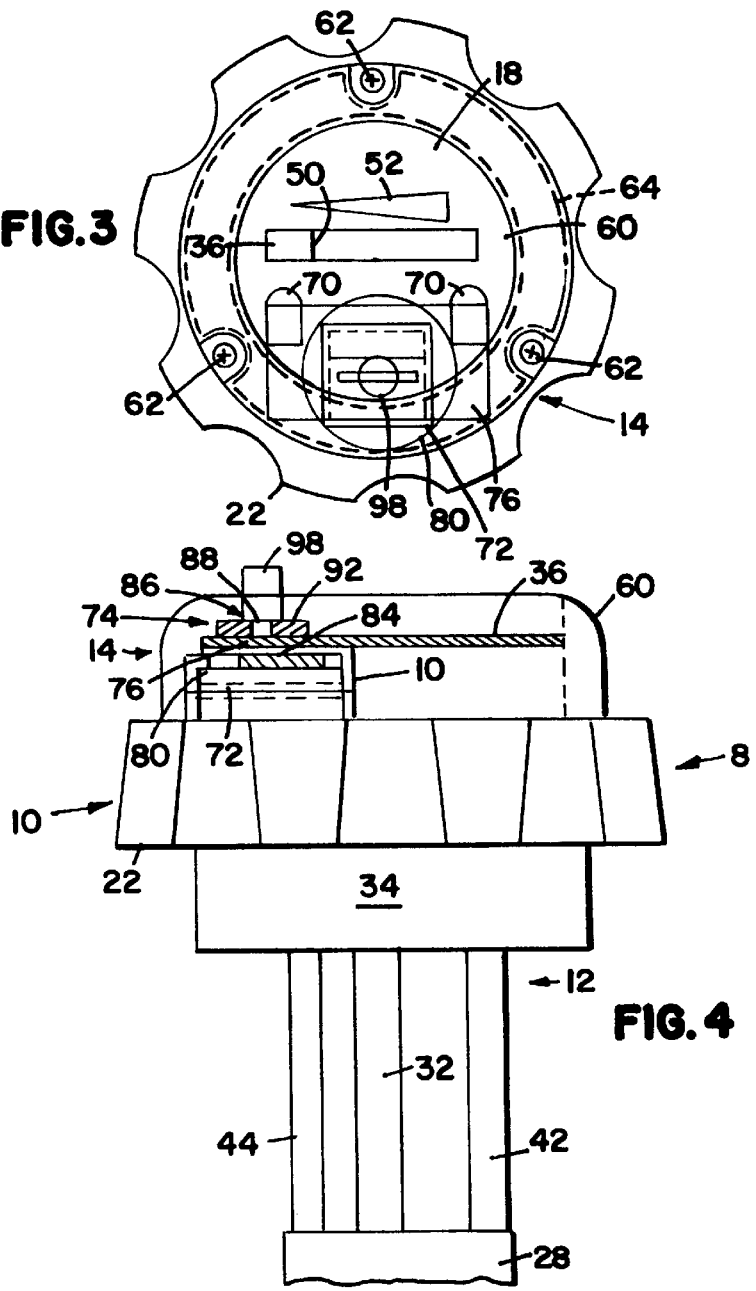

ILLUMINATED COVER FOR CONTAINERS, TANKS AND THE LIKE

This is a continuation of application Ser. No. 08/227,268, filed Apr. 13, 1994, now abandoned.

TECHNICAL FIELD

The present invention relates to covers or caps for containers. More particularly, the present invention relates to a fuel tank cover having a gauge associated therewith, wherein the gauge may be illuminated by an integral lighting arrangement.

BACKGROUND OF THE INVENTION

Typically, recreational vehicles and machines such as snowmobiles, boats, motorcycles and the like have an onboard fuel tank with a cover or cap assembly having an integral, mechanical float-type fuel gauge. Lawn and garden power equipment and agricultural equipment (e.g., mowers, tractors, etc.) frequently are provided with a similar arrangement. Portable auxiliary fuel tanks or cells also may be equipped with such cover and gauge assemblies.

One common form of such fuel tank cap and integral gauge arrangements involves the well-known threaded screw cap for tightening on complementary threads around the opening into a fuel tank and an attached low density member for being received in the tank. The low density member is slidably mounted on an elongated spiral, ribbon-like rigid turning member which extends into the tank and is fixedly attached to a pivotable needle housed in the cover or cap itself. When the cover is in place on the tank or container, the spiral member extends into the tank and the low density member floats on the surface of the contents. The position of the low density member along the spiral member causes the needle in the cover to register the amount of the contents.

In daylight hours this type of gauge is easily visible and convenient to use. However, in darkness it is impossible to read the gauge unless a separate auxiliary source of light is provided, something which is not always convenient or possible.

Snowmobiles provide an excellent example of the aforementioned problem. A snowmobile is a motorized sled having a chassis, two steerable front skis and an engine-driven, snow-contacting track. In certain areas of the United States, e.g., the New England states, the Mountain states and, particularly, in the upper Midwest, snowmobiles have become extremely popular. Snowmobiles are now owned, rented and used in the thousands and a well-defined, off-road trail system, complete with traffic control and directional signs, has been developed.

Snowmobiles are frequently used in the evening and at night because people do not have time to ride during business hours and because night riding is exciting. It is not uncommon to see large numbers of snowmobilers during evening or nighttime hours. The vehicles may be driven many miles, for example, between restaurants or recreational sites, or merely for touring a trail system or the backcountry. The dangers of running out of fuel in the winter in a remote area are significant, particularly at night. Therefore, it is important that the fuel level be monitored frequently and closely. Typically the operator must stop and use a detached light source such as a flashlight to check the fuel level. Stopping in the cold, on or near a trail, is inconvenient and even dangerous. Obviously, for a driver of a snowmobile to attempt to check the fuel level using a flashlight while moving is even more dangerous.

The operation of snowmobiles at night provides only one situation or example of the problem of monitoring a fuel supply in the dark. Motorcyclists and boaters may face the same difficulty. Accordingly, there is a need for a simple, safe, efficient method and apparatus for illuminating a fuel tank cover and gauge assembly.

SUMMARY OF THE INVENTION

The problem and need outlined above is in large part addressed by the present invention which provides for the selective illumination of a container cap or cover having a built-in gauge. The illuminated cover and gauge assembly of the present invention enables monitoring the contents level of a container without resorting to the use of detached, supplementary lighting means.

Broadly, the present invention provides an illuminated cover including a cover body with a transparent portion. The cover body and transparent portion cooperate to form a housing resistant to penetration by fluid. A selectively operable illuminating system, including at least one light source, a power source connected to the light source and an operating mechanism connected between the power source and light source, is associated with the housing.

More particularly, the present invention comprises container cover having a cover body and a transparent portion spaced from and connected to the cover body to form a housing resistant to penetration by fluid, particularly caustic or volatile fluids such as gasoline or other fuels, but to water or moisture as well. A contents level indicating gauge is integrated with the cover inside the housing and includes a visible read-out indicator. An illuminator, preferably comprising at least one light emitting diode (LED), is mounted in the housing along with a battery electrically connected to the LED and a switch arrangement electrically connected between the battery and the LED. The switch includes a spring biased actuating button, at least a portion of which is outside the housing, for selectively actuating the LED.

The present invention is designed to be used as an original equipment gas cap or cover for the fuel tanks of recreational vehicles, but it may be used to replace the typical gas cap of such vehicles. Further, the illuminated cover of the present invention may be used to facilitate monitoring the contents of any stationary or portable container or tank in any agricultural, industrial, commercial or residential setting.

In an alternative embodiment, the illuminated cover and gauge system of the present invention may be designed and used as a stand-alone illuminated gauge system permanently mounted in the wall of a fuel, water or chemical container or tank having a discreet access or filling opening to conveniently monitor the amount of contents therein without opening the container.

An object of the present invention is to provide a gas cap with an illuminated, integral gas gauge, particularly for use with snowmobiles.

Another object of the present invention is to provide an illuminator for a gas cap having an integral mechanical gas gauge, particularly for use with such vehicles as snowmobiles, motorcycles or boats.

Still another object of the present invention is to provide an illuminated container cover, particularly for use on the fuel tank of such vehicles as snowmobiles, motorcycles or boats, but adaptable for use on any container wherein it would be desirable to view the cover without using a flashlight or the like.

A further object of the present invention is to provide a selectively illuminating contents measuring arrangement including an integral, selectively operable illumination system.

Yet another object of the present invention is to provide a selectively illuminated fuel tank cover or cap including a built-in fuel gauge, wherein the cover or cap includes an integral, selectively operable illumination means for illuminating the gauge.

A feature of the present invention is a sealed, fluid and weather resistant housing, a portion of which is clear or transparent, which provides for mounting of the visible portion of a gauge and illuminating components of the present invention including the power source, the light emitting diodes, the required circuitry and a reed switch.

Another object of the present invention is to increase the safety and comfort level of operating recreational vehicles such as snowmobiles, motorcycles, all-terrain vehicles, boats and the like in the dark by ensuring that adequate fuel supplies are available and by enabling the monitoring of available fuel without resorting to supplementary, detached lighting systems.

Additional advantages of the present invention are that it may be easily adapted to a wide variety of containers for containing a variety of contents, it may be integrated with a cap or cover for a filling or drain aperture of a container or it may be used as a stand-alone, permanently mounted illuminated contents level monitoring device.

Other objects and advantages of the present invention will become more fully apparent and understood with reference to the following specification and to the appended drawings and claims.

BRIEF DESCRIPTION OF THE DRAWINGS

FIG. 2 is a fragmentary cross-sectional detail depicting the actuating and control button component of the present invention.

FIG. 3 is a top plan view of an illuminated gas cap and gauge in accordance with the present invention.

FIG. 4 is an elevational view, partially in cross-section, depicting an illuminated gas tank cap in accordance with the present invention.

DETAILED DESCRIPTION OF THE PREFERRED EMBODIMENT

Figure 1:
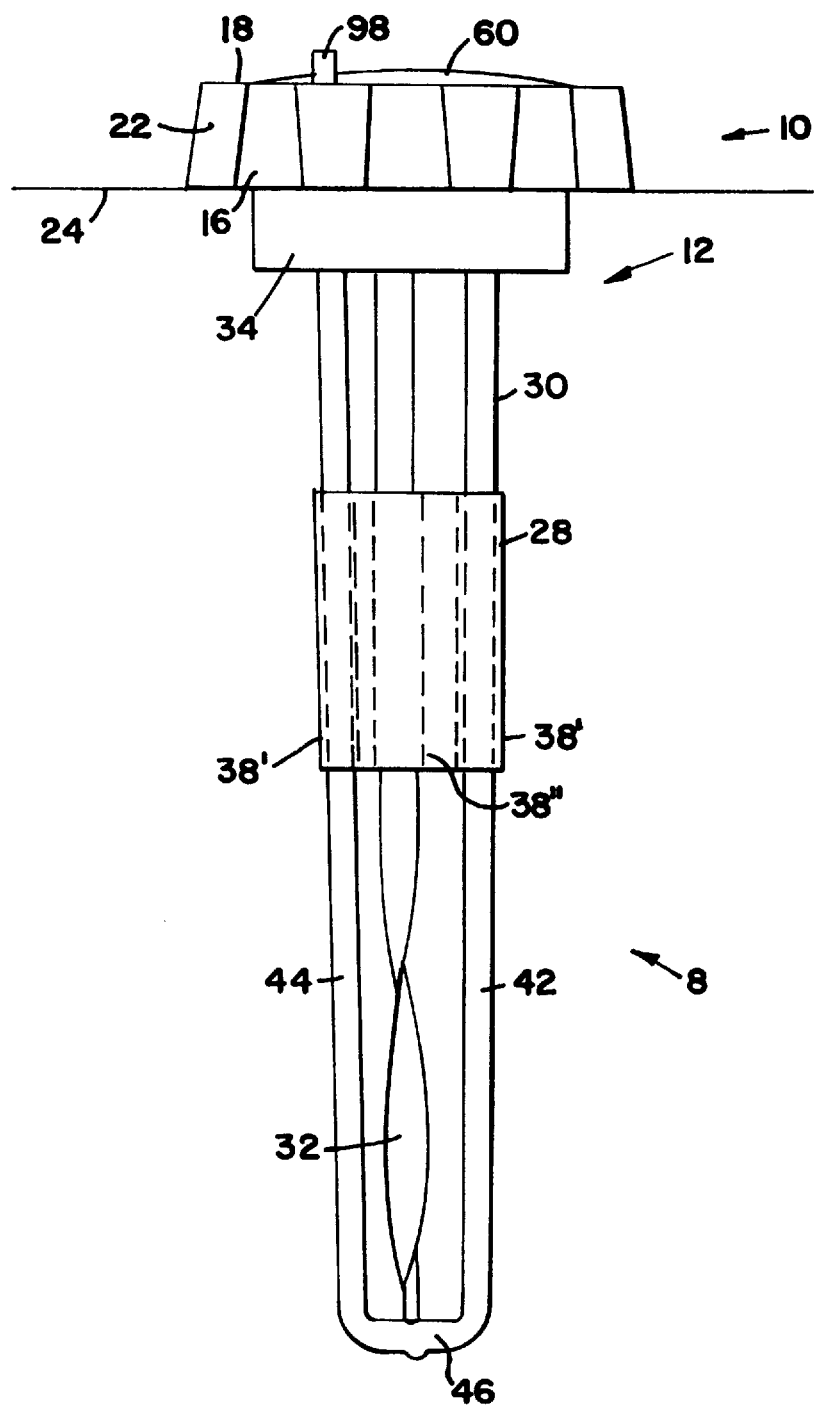
FIG. 1 is an elevational view of an illuminated gas cap and gauge in accordance with the present invention.

Referring to the drawings, an illuminated cover and gauge assembly 8 for containers and tanks in accordance with the present invention broadly includes a cover 10, a gauge mechanism 12 and an illuminator 14 (FIG. 3).

The cover 10 has a body 16 with a generally flat, circular central uppermost exterior portion 18 and a knurled or textured circumferential rim 22. As is customary and well-known, a portion of the cover 10, usually inside the knurled rim 22, is threaded so that the cover 10 can be received securely on complimentary threads associated with the aperture of the container or tank, represented at 24. The depicted cover 10 is intended to be representative of many common tank or container covers which generally use some form of threaded or bayonet connection with a tank or container.

With reference to FIG. 1, the gauge mechanism 12 is integrated with the cover 10 and includes a float 28, a float cage 30, an elongated spiral member 32, a transmission linkage represented at 34, and a display or read-out indicator 36 (best seen in FIG. 3). The float 28 is formed of a low density material selected to be resistant to the intended contents of the tank with which it is to be used. Examples of such material appropriate for use in fuel tanks include cork or suitable plastics. At least three co-diametrically aligned bores or openings, including two outer openings 38' and a single central, slot-like opening 38" along the axis of the float 28, are provided in the float 28.

The float cage 30 is fixedly attached to the generally central region of the underside or inside surface of the cover 10 and comprises a generally U-shaped, wire or rod-like support guide having two generally parallel legs 42, 44 and a base 46 connecting the legs 42, 44 at the ends thereof furthest from the cover 10. At their opposite ends, the legs 42, 44 are secured to the underside of the cover 10. The legs 42, 44 are slidably received in the outer openings 38' of the float 28.

The elongated spiral member 32 is slidably received in the central opening 38" of the float 28 and is pivotally attached to the base 46 at one end. At its other opposite end (not visible, but inside the linkage 34), the spiral member 32 is operably connected to an indicator needle 50 (FIG. 3). From the foregoing description, it should be appreciated that, depending on the amount or level of the fuel in the tank, the float 28 will slide to and rest at a certain position along the spiral member 32. The sliding of the float 28 along the spiral member 32 as the contents level changes necessarily turns the spiral member 32 and moves the needle 50 along the scale 52 associated with the read-out indicator 36 thereby indicating the amount or level of the fuel in the tank. The depicted gauge and indicator are intended to be representative of mechanical float-type gauges including those have rotating needle-type display indicators.

Referring to FIGS. 1, 3 and 4, the exterior portion 18 of the cover 10 carries a transparent member or bezel 60. The transparent member 60 should be made, formed or molded from a clear, fracture resistant material (hardened glass, polycarbonate or the like) resistant to ultraviolet light and volatile liquids such as gasoline. It may be slightly domed as suggested in FIGS. 1 and 3, but also may have a substantially flat surface as shown in FIG. 4. Referring to FIG. 3, the transparent member 60 is secured to the cover 10 by an appropriate number of screws 62 equidistantly spaced about the circumference of the cover. A sealing member 64 is captured and fixed between the cover 10 and the transparent member 60 to further define the interior space of a sealed housing resistant to penetration by fluid, including water and more volatile liquids such as various fuels. The sealing member 64 may be a flattened gasket, an O-ring type seal or may be selected from other similar sealing means formed from appropriate material. As an alternative to using mechanical fasteners to attach the transparent member 60 to the cover 10, a suitable adhesive may be used alone or in combination with mechanical fastening means such as screws, rivets and the like.

Referring to FIGS. 3 and 4, the illuminator 14 for selectively illuminating the integrated cover 10 and gauge mechanism 12 of the present invention includes at least one light emitting diode (LED) light source 70 (two substantially identical LEDs are preferred, both indicated at 70), a battery power source 72 operably connected to the light source 70 and an operating mechanism, indicated generally at 74 in FIG. 4. These components are carried on a commercially available wiring or circuit board 76 or the like, pre-drilled or otherwise prepared to accept and support wiring and other electrical components, but a printed circuit board may be used as well. The board 76 may be attached or fixed to the cover 10, captured and fixed between the cover 10 and the transparent member 60 or fixed to or integrated with the transparent member 60 by suitable fastening means (e.g., molded integrally, screws, pins or adhesives). In any case, the board 76 and the components of the illuminator 14 carried thereby are substantially within the sealed housing provided by the cover 10 and transparent member 60, with the exception of a portion of the operating mechanism 74, as will be explained below.

The preferred light source for the present invention is two high efficiency light emitting diodes 70 attached to the board 76. The diodes 70 are spaced from each other, and generally in close relation to the indicator 36 so that the light they produce when energized is cast effectively on the indicator 36. Appropriate LEDs will draw approximately three to ten milliamps, with LEDs drawing five milliamps being preferred. Such LEDs are commercially available, usually carrying model numbers HLMP4700, HLMP4719 or HLMP4740, from manufactures such as Telefunken, LiteOn, Quality Technologies Corp. and HIV.

With continued reference to FIGS. 3 and 4, the battery power source 72 is a three volt lithium battery, cell or the like. Such batteries are commercially available, and may be represented by battery model number CR2450N, manufactured by Renata or Panasonic. The battery 72 is mounted directly to the board 76 or in a battery holder 80 (typically available from the battery manufacturer) attached to or integrated with the board 76. The holder 80 permits the user to replace the battery 72 if it becomes exhausted. In the preferred, two LED embodiment of the present invention, a battery should provide an estimated year or more of power.

Referring to FIGS. 3 and 4, the operating mechanism, indicated generally at 74 (FIG. 4), for controlling the flow of energy from the battery 72 to the light source 70 of the present invention includes a hermetically sealed, reed switch 84 and an actuating mechanism 86. The switch is carried (e.g., by soldering, adhesives or other appropriate means of attachment) on the board 76 and is of the type known as model number MDSR-7, made by Hamlin. It ideally will be rated for a maximum current of 0.5 amp, a maximum DC wattage of 10 watts and a maximum voltage of 200 volts. The switch 84 is actuated or turned off and on by virtue of its sensitivity to a magnet 88 carried by the actuating mechanism 86.

Referring particularly to FIG. 2, the actuating mechanism 86 includes a body 90 with legs 92 extending from the side of the body 90 closest to the board 76. The legs 92 form at least two side spring housings 94 for receiving a compression spring 96. One end of the springs 96 will contact the board 76 when the actuating mechanism 86 is assembled as shown in FIG. 4. The magnet 88 is positioned generally between the spring housings 94. On the opposite side of the body 90, a finger-receiving actuating button 98 extends from the body 90. As shown in FIG. 4, the button 98 extends or protrudes through an opening in the transparent member 60 so it can be depressed. The integrity of the housing created by the cover 10 and the transparent member 60 is preserved by providing an O-ring seal member 100 between the button 98 and the transparent member 60. The shoulders 91 of the body 90 act as an outward travel limiting means, abutting the inside surface of the transparent member 60 at the limit of travel. The ends of the legs 92 limit the inward travel of the actuating mechanism 86 when they contact the board 76.

Figure 5:
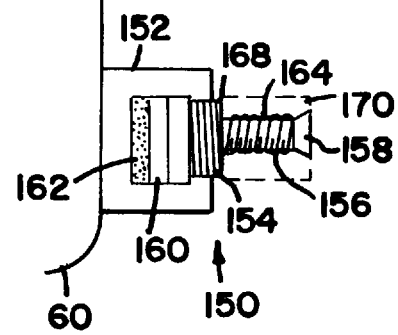
FIG. 5 is an elevational view depicting a second embodiment of the actuating mechanism of the present invention in its steady-state, off position.
Figure 7:
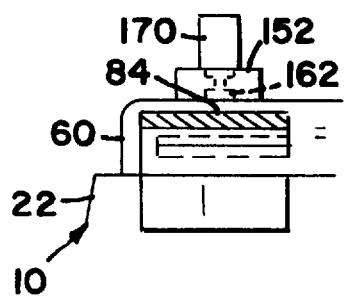
FIG. 7 is a partial elevational view depicting the relationship of the second embodiment actuating mechanism and the cover and gauge assembly of the present invention.
Figure 6:
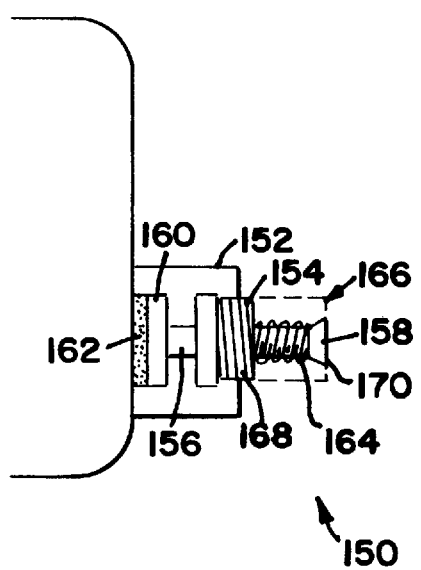
FIG. 6 is an elevational view of the second embodiment actuating mechanism in an on position.

FIGS. 5, 6 and 7 depict a second embodiment, "plunger-type" actuating mechanism 150 for use in the illuminated cover 10 of the present invention. One end of the housing 152 (formed of suitable material, e.g., hard plastic or metal, as a single piece) is secured to the outer surface of the transparent member 60. The other end of the housing 152 carries a shaft bushing and holder 154 which may be threadably received in the housing 152, press fit therein or secured therein by adhesive. The bushing 154 holds and guides a shaft 156 slidably received therein. The shaft 156 has one expanded end 158 and the other end carries an aluminum or plastic disk 160. A permanent magnet 162 is secured to the disk 160. A compression spring 164 extends between the expanded end 158 of the shaft 156 and the bushing 154 to pull or drive the magnet 162 away from the transparent member 60 (and reed switch 84 therein) to the "off" position shown in FIG. 5. A hex seal 166 having a threaded base portion 168 and a rubber boot portion 170 (of the type manufactured by APM Hexseal of Englewood, N.J.) is connected to the bushing 154 to seal the actuating mechanism 150.

FIG. 6 depicts the actuating mechanism 150 with the shaft 156 pushed inwardly, temporarily deforming the boot 170 in the process and bringing the magnet 162 close enough to the reed switch 84 to excite it, turning on the LEDs 70. FIG. 7 is provided to illustrate the relationship of the second embodiment actuating mechanism 150 and the rest of the cover and gauge assembly 10, common to both embodiments of the actuating mechanism (86, 150).

In use, as the vehicle (e.g., snowmobile) is being driven, to check the fuel supply the driver simply removes one hand from the handlebar or steering mechanism, and reaches to touch or depress the button 98. Doing so moves the button 98 toward the board 76 against the bias provided by the springs 96 and moves the magnet 88 carried by the board 76 into closer proximity to the switch 84. After the button 98 travels about an eighth of an inch or when the magnet 88 is approximately within 0.08" of the switch 84 (depending on the magnet strength), the switch 84 responds by closing, completing the circuit between the battery 72 and the LEDs 70 causing the LEDs 70 to emit light illuminating the fuel gauge indicator 36. When the button 98 is released it, and the magnet 88 carried thereby, moves away from the switch 84 under the influence of the springs 96 toward its steady-state off position and the switch opens, interrupting the flow of power from the battery 72 to the LEDs 70.

It will be seen that a new and improved illuminated cover and gauge for containers, tanks and the like, particularly for the fuel tanks of snowmobiles, is provided. One advantage of the present invention stems from the use of the magnetically sensitive, hermetically sealed reed switch 84. Because there are no exposed contacts, there is no possibility of arcing and ignition of fuel vapor. Thus, the illuminated cover 10 of the present invention has wide utility, particularly for use on containers holding volatile contents.

The illuminated cover or cap 10 of the present invention may take different forms within the scope of the invention. The actuating mechanism (86, 150) may be repositioned with respect to the cover 10, i.e., it may be associated with the cover 10, a side wall of the cover 10, a side wall of the transparent member 60 or with the face of the transparent member 60 as depicted. In some embodiments it may include the use of more or fewer LEDs, including arrays thereof. While LEDs are the preferred light source, other light sources such as low voltage bulbs may be used as well. Chemical or electrochemical luminescence may be used to produce or enhance light to illuminate the cover assembly 8 of the present invention. Various direct current power sources, including multiple batteries, may be used, and for permanent installations such as on portable or nonportable industrial or agricultural tanks, the illuminator of the present invention may be coupled to a remote power source. A touch-sensitive switch or the like may be used rather than the operating button, and the mechanical gauge linkage and indicator may be replaced by a digital sensing and read-out gauge system. The preferred embodiment of the present invention provides an illuminated fuel tank cover and gauge assembly, but it may be adapted to provide a lighted cover lock feature as well.

The present invention may be embodied in other forms without departing from the spirit or attributes thereof, and it is desired that the described embodiments be considered in all respects as illustrative and not restrictive, reference being made to the appended claims rather than to the foregoing description to indicate the scope of the invention.

What is claimed is:

1. A selectively illuminated cover for removably closing a container wherein the amount of contents contained in the container varies, said cover comprising:
    a cover body;
    a transparent member connected to an exterior surface of the cover body to form, in combination with the cover body, a fluid resistant housing;
    a gauge including an indicator in the housing, said gauge carried by the cover body for measuring and indicating the amount of contents in the container;
    an illuminator carried by the transparent member for illuminating the indicator in the housing and including at least one light emitting diode, a battery and circuitry electrically coupling the at least one light emitting diode and the battery;
    a magnetically sensitive reed switch carried by the transparent member for operating the illuminator, said switch operably, electrically coupled to the circuitry for controlling the flow of electricity from the battery to the at least one light emitting diode; and
    an actuator carrying a magnet, said actuator carried by the transparent member adjacent to the reed switch and movable to change the proximity of the magnet and reed switch, thereby opening and closing the circuitry to deactivate and activate the at least one light emitting diode thereby selectively illuminating the indicator.

2. An illuminating apparatus for providing selective illumination of a gauge cover for a fuel tank of a vehicle, said apparatus comprising:
    a transparent member sealingly connected to the cover to form a fluid resistant housing;
    at least one light emitting diode and a battery mounted adjacent to the housing and operably, electrically coupled by circuitry also adjacent to the housing; and
    a magnetically sensitive reed switch mounted adjacent the housing and operable from outside the housing and operably, electrically coupled to the circuitry between the battery and the at least one light emitting diode for controlling the flow of electricity from the battery to the at least one light emitting diode, wherein the cover further comprises a fuel level indicator substantially within the housing for indicating the amount of fuel in the fuel tank.

3. The illuminating apparatus of claim 2, further comprising an actuator and a magnet, wherein said actuator is movable from outside the housing to change the proximity of the magnet and reed switch, thereby operating the reed switch.

4. The illuminating apparatus according to claim 3, further comprising a gauge including a float operatively connected to the indicator.

5. An illuminating apparatus for selectively illuminating an object, said illuminating apparatus comprising:
    a housing constructed for attachment to an object for illumination thereof;
    an illuminator connected to the housing and comprising a light emitting diode, a battery, and circuitry connecting the light emitting diode and the battery, said circuitry including a magnetically sensitive reed switch constructed and arranged for opening and closing the circuit between the battery and the light emitting diode in response to a change in a magnetic field around said reed switch, wherein the reed switch is rated for maximum current of 0.5 amp; and
    an actuator comprising a mechanically operated switch and a magnet for altering the magnetic field around said reed switch and a spring, said mechanically operated switch being constructed for providing movement of the magnet between a first position and a second position which alters the magnetic field around said reed switch, and said spring being provided for biasing the mechanically operated switch to provide the magnet at the first position.

6. The illuminating apparatus according to claim 5, wherein said reed switch is hermetically sealed.

7. The illuminating apparatus according to claim 5, wherein the light emitting diode draws between about 3 and about 10 milliamps.

8. The apparatus according to claim 5, wherein said housing further comprises a transparent member comprising a fracture resistant material.

9. The illuminating apparatus according to claim 8, wherein the fracture resistant material comprises polycarbonate.

10. The illuminating apparatus according to claim 8, wherein the fracture resistant material comprises hardened glass.

11. An illuminating apparatus for selectively illuminating an object, said illuminating apparatus comprising:
    a housing constructed for attachment to an object for illumination thereof;
    an illuminator connected to the housing and comprising a light emitting diode, a battery, and circuitry connecting the light emitting diode and the battery, said circuitry including a magnetically sensitive reed switch constructed and arranged for opening and closing the circuit between the battery and the light emitting diode in response to a change in a magnetic field around said reed switch, wherein the illuminator is in contact with the housing; and
    an actuator comprising a mechanically operated switch and a magnet for altering the magnetic field around said reed switch and a spring, said mechanically operated switch being constructed for providing movement of the magnet between a first position and a second position which alters the magnetic field around said reed switch, and said spring being provided for biasing the mechanically operated switch to provide the magnet at the first position.

12. The illuminating apparatus according to claim 11, wherein said reed switch is rated for a maximum current of 0.5 amp.

13. The illuminating apparatus according to claim 11, wherein said reed switch is hermetically sealed.

14. The illuminating apparatus according to claim 11, wherein the light emitting diode draws between about 3 and about 10 milliamps.

15. The illuminating apparatus according to claim 11, wherein said housing further comprises a transparent member comprising a fracture resistant material.

16. The illuminating apparatus according to claim 15, wherein the fracture resistant material comprises polycarbonate.

17. The illuminating apparatus according to claim 15, wherein the fracture resistant material comprises hardened glass.

18. The selectively illuminated cover according to claim 1, wherein said actuator is substantially constantly urged to a steady-state rest position at which the indicator is not illuminated.

\* \* \* \* \*